UNITED STATES PATENT OFFICE 2,176,889

PHENANTHRIDINE DERIVATIVES

Walter G. Christiansen, Glen Ridge, N. J., and William Braker, Brooklyn, N. Y., assignors to E. R. Squibb & Sons, New York, N. Y., a corporation of New York No Drawing. Application December 22, 1934, Serial No. 758,824

2 Claims. (Cl. 260—288)

This invention relates to, and has for its object the provision of, certain phenanthridine derivatives and methods for the preparation thereof.

The compounds of this invention, which are derived from phenanthridine

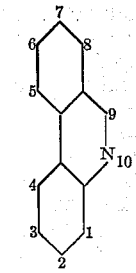

have the general formula

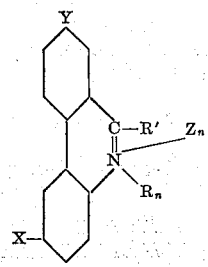

wherein X represents a nitro, amino, or acylamino group; Y represents a nitro, amino, or acylamino group when X is an amino or a nitro group, but Y otherwise represents a nitro, amino, or acylamino group or hydrogen; Z represents a halogen; R represents an alkyl; $n$ represents 0 or 1; and R' represents an alkyl, a mononuclear aryl, or a para-dialkylaminophenyl iminomethyl group.

Examples

*3,7-dinitro 9-methyl phenanthridine*

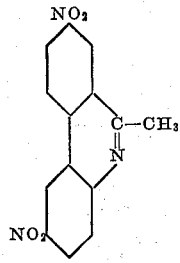

2.3 g. 3-nitro 9-methyl phenanthridine

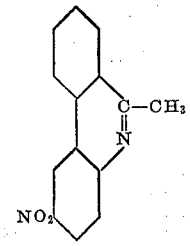

prepared according to the method of Morgan and Walls, 1932 J. C. S. 2225–2231, is added gradually, with stirring, to a mixture of 15 cc. nitric acid (D 1.5) and 15 cc. concentrated sulfuric acid, the mass during the addition and for fifty minutes thereafter being maintained at about 0°; the mass is then poured into 200 cc. cold water; the resulting suspension is made ammoniacal and filtered; the residue is washed with water, dried in vacuo, and purified by suspending it in warm acetone (to remove tarry contaminants), filtering, washing with acetone, and drying in vacuo; and the desired compound is thus obtained in the form of yellow crystals melting at 231–232°.

*3,7-diamino 9-methyl phenanthridine*

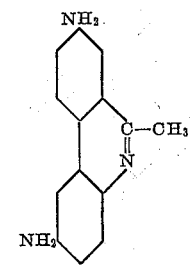

6.0 g. 3,7-dinitro 9-methyl phenanthridine is suspended in 100 cc. 4% hydrochloric acid; the mass is heated and stirred; 14 g. iron filings is added during half an hour; the mixture is heated and stirred two hours and filtered; the residue is washed with water, dried in vacuo, and extracted with chloroform in a Soxhlet apparatus; and on evaporating the extract to a small volume and diluting it with petroleum ether, the desired compound is obtained in the form of yellowish-brown crystals, which when filtered off, washed with petroleum ether, and dried in vacuo, melt at 205–207°.

*3,7-diacetamino-9-methyl phenanthridine*

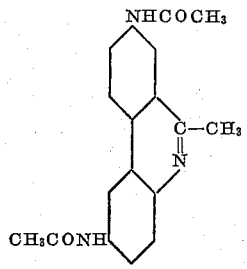

2.6 g. 3,7-diamino 9-methyl phenanthridine is refluxed six and one-half hours with 1.0 g. acetic anhydride and 50 cc. benzene; the excess acetic anhydride and benzene are distilled off in vacuo; the residue is diluted with water; the resulting suspension is made ammoniacal; the mass is filtered; and the residue, being washed with water and dried in vacuo, yields the desired compound as a brown substance that shrinks at 235° and does not melt by 265°.

*3,7-diacetamino 9,10-dimethyl phenanthridinium sulfate*

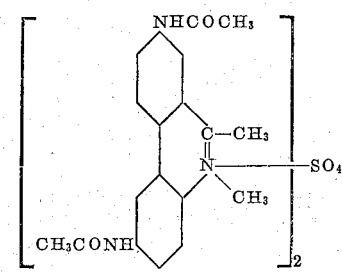

2.5 g. 3,7-diacetamino 9-methyl phenanthridine is dissolved in 35 cc. hot nitrobenzene; 1.5 g. dimethyl sulfate is added; and upon cooling, the desired compound crystallizes from the solution in the form of reddish-brown needles, which, on being filtered off, washed with benzene, and dried in vacuo, are found to be very hygroscopic.

*3,7-diamino 9,10-dimethyl phenanthridinium chloride*

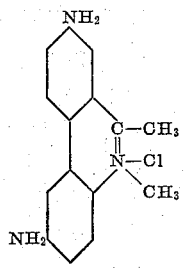

2.5 g. 3,7-diacetamino 9,10-dimethyl phenanthridine sulfate is refluxed four hours with 50 cc. 1:1 hydrochloric acid; there is added 50 cc. water and just enough aqueous ammonia to make the acidity of the solution only faint; and the desired compound separates out in the form of reddish-brown crystals.

*3-amino 9-[(p-dimethylaminophenyl) iminomethyl] 10-methyl phenanthridinium chloride*

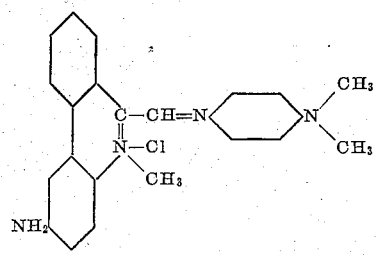

2.6 g. 3-amino 9,10-dimethyl phenanthridinium chloride is dissolved in a mixture of 85 cc. alcohol and 15 cc. water; 1.6 g. p-dimethylamino nitrosobenzene in 20 cc. alcohol and three drops of piperidine are then added; the solution is refluxed one and one-half hours on the steam bath; 50 cc. water is added; the black crystalline substance separated out is filtered out; and on concentrating the filtrate to a small volume, the desired compound is obtained in the form of reddish-black crystals, which on being filtered off, washed with cold water, and dried in vacuo, yield a powder melting at 119–121°.

Compounds of this invention are useful as antiseptic agents.

It is to be understood that the foregoing examples are merely illustrative and by no means limitative of the invention, which may be variously otherwise embodied—as with respect to the particular substituents at the 3, 7, 9, and 10 positions and the reactants and processes employed—within the scope of the appended claims.

We claim:

1. 3,7-diamino 9,10-dimethyl phenanthridinium chloride.

2. 3,7-diamino 9-alkyl 10-alkyl phenanthridinium halides.

WALTER G. CHRISTIANSEN.
WILLIAM BRAKER.